Sept. 5, 1950  H. G. HEINRICH  2,520,931
AUTOMATIC OPENING CONTROL FOR PARACHUTES
Filed May 17, 1949  4 Sheets-Sheet 1

INVENTOR.
HELMUT G. HEINRICH
BY
ATTORNEYS

Sept. 5, 1950 H. G. HEINRICH 2,520,931
AUTOMATIC OPENING CONTROL FOR PARACHUTES
Filed May 17, 1949 4 Sheets-Sheet 3

INVENTOR.
HELMUT G. HEINRICH
BY
ATTORNEYS

Patented Sept. 5, 1950

2,520,931

UNITED STATES PATENT OFFICE 2,520,931

AUTOMATIC OPENING CONTROL FOR PARACHUTES

Helmut Gustav Heinrich, Dayton, Ohio

Application May 17, 1949, Serial No. 93,813

13 Claims. (Cl. 244—152)

(Granted under the act of March 3, 1883, as amended April 30, 1928; 370 O. G. 757)

The invention described herein may be manufactured and used by or for the Government for governmental purposes without payment to me of any royalty thereon.

My invention relates to parachutes and more particularly to automatic opening control means for high speed parachutes, having for an object, improved means for regulating the rate of opening of parachutes to reduce the opening shock and initial loading, particularly when the parachute is released at high speeds.

Invention deals with the problem of regulating the drag area of a parachute so that the drag to load ratio is maintained substantially constant and at a predetermined minimum as long as the velocity of the chute with the sustained load and the drag to load ratio is greater than the predetermined velocity and ratio of drag to load, providing means for reducing the opening shock eliminating high deceleration and cushioning excessive stretch shock.

A further object is the regulation of the drag area of the parachute by reefing, utilizing means which regulate the reefing, and drag area automatically in a predetermined ratio to the loading of the parachute.

According to this invention, the size of the opening of the skirt or air inlet is determined by a large number of independent reefing cords or lines and load suspension lines, each reefing line being regulated according to the prevailing drag of the canopy of the chute, and not dependent upon other mechanical or manually operable control devices, the reefing cords being solely controlled by the ratio of drag of the canopy to the pull of the attached load, so that my improved parachute will be automatically reefed or unreefed according to the ratio of the drag of the canopy to the pull or tension of the load on the suspension or shroud lines. This is important when the chute is released at high Mach numbers where the actual opening shock must be controlled and where high deceleration may be expected, and for instance, when the attached body or load, and the chute enters the high density of the troposhere at a high velocity. Parachutes manufactured according to this invention need only be sufficiently strong to absorb a predetermined drag force and shock stretch, and since this drag force is usually lower than the opening shock, these improved chutes can be safely released at higher velocities and at the same time constructed of lighter materials.

These and other objects and advantages of the invention will appear from the following description, reference being had to the accompanying drawings in which like reference characters refer to like parts in the several figures.

Referring more particularly to Figs. 1 to 5, the reference numeral 1 indicates a parachute canopy of substantially hemispherical shape composed of light, strong, flexible fabric material such as silk or nylon, and may be made porous by a porous weave, or include the usual apex vent, the shroud or load suspension lines 2 extending downwardly from the skirt portion of the canopy have a suitable load securing device or harness fastened thereon as indicated generally at 3, to which the load or the body 4 to be lowered, is secured.

Figure 3:
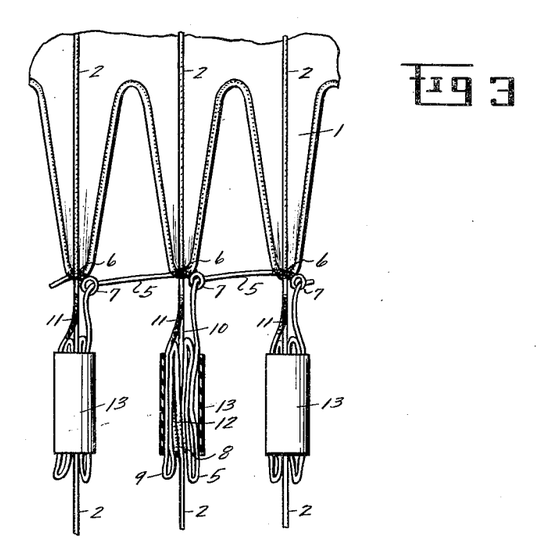
Fig. 3 is an enlarged fragmentary view of the lower or skirt portion of a chute constructed in accordance with the invention, illustrating the same in reefed condition and before the load or downward pull has been applied to the load suspension lines, sleeve members being provided for preventing the displacement and tangling of the reefing and shroud lines while in packed condition and during opening.
Figure 4:
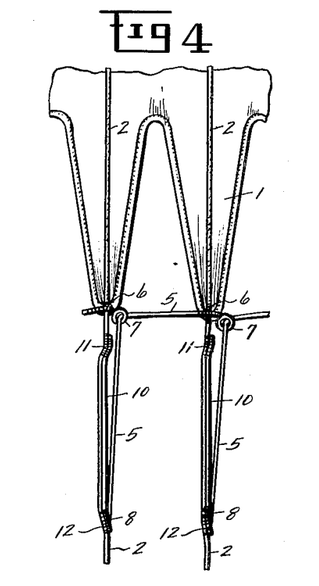
Fig. 4 is a view similar to Fig. 3, showing the elastic members stretched or extended to straighten out the slack portions in the load suspension lines and maintain the chute in reefed condition.
Figure 5:
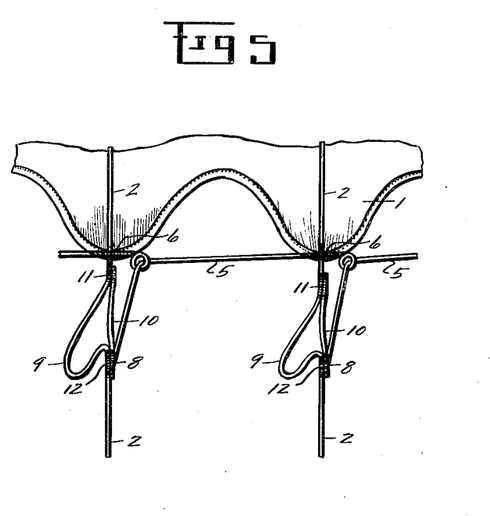
Fig. 5 is a similar view illustrating a portion of the skirt of the canopy after the parachute has been decelerated and opened to substantially its maximum diameter or drag area.

A plurality of reefing cords or lines are provided, as indicated at 5 in Figs. 3 to 5, the reefing lines each being secured near one of their ends, adjacent the points where each of the suspension lines cross the skirt portion of the canopy. The upper or canopy secured ends of the reefing lines are looped as indicated at 6, a reefing or reefing line snubbing ring 7 is securely retained in the loop 6. In the arrangement shown in Figs. 3 to 5 the other or lower ends of the reefing lines extend laterally passing through the reefing rings 7 which are located on the adjacent reefing lines 6 and extend downwardly, as shown in the drawing, with their other or lower ends securely fastened to the load suspension lines 2, as indicated at 8. The suspension lines 2 are each preferably looped to provide slack portions as indicated at 9, preferably between points just above the junctions or connections 8 of the reefing lines 5 with the load suspension lines 2 and just below the canopy skirt. An elongated extensible member 10, preferably of elastic material, is secured at 11 and 12 across each of the looped or slacked portions 9. The elastic members 10 each having a predetermined strength and degree of stretch relative to the drag to pull ratio required to maintain the canopy reefed, and may be formed of rubber or a coil spring, it being necessary of course that the elongation of the elastic members be sufficient to allow the looped or slack portions 9 of the load suspension lines to straighten out as shown in Fig. 4 when a predetermined load is applied to the lower ends of the load suspension lines 2 relative to the canopy drag, sufficient to draw the reefing cords 5 downwardly when the load or shock is excessive maintaining the canopy reefed or reefing the air entrance of the lower edge of the skirt portion of the canopy.

Figure 2:
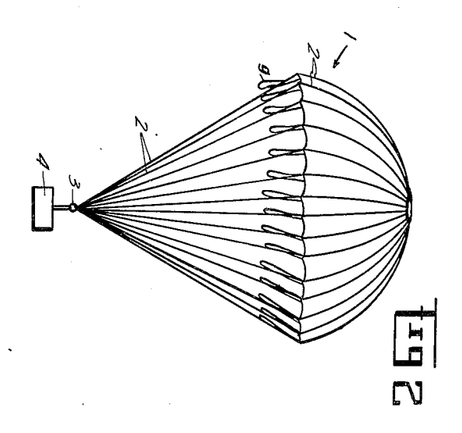
Fig. 2 is a similar view illustrating the chute in fully opened condition.

In order to keep the reefing lines from fouling when the chute is packed, with the mouth of the canopy contracted or reefed as shown in Fig. 3, a plurality of elastic collars or sleeves 13 is provided. The reefing lines are carefully folded and inserted in these sleeves 13, together with the elastic members 10, and, if desirable, portions of the load suspension lines may also be folded and inserted in the sleeves. When the chute is released at high velocities the inertia of the load 4 and the pull or tension on the lower ends of the shroud lines 2 in one direction relative the resistance or drag of the parachute canopy 1 in the opposite direction stretches the elastic members 10, withdrawing the lower end portions of the reefing lines 5, and the load suspension lines 2, from the retaining collars or sleeves 13. This action, of course, takes up the slack in the reefing lines as the pull of the load is applied to the lower end of the load suspension lines stretching the elastic members 10, and eliminating the slack 9 in the suspension lines 5, as shown in Fig. 4. The lower end portions of the suspension or shroud lines 2 carry the main portion of the load and shock, but since the mouth of the canopy is reefed, the relatively small canopy drag area presented initially allows the load and chute to be decelerated gradually until the canopy drag to the pull of the load ratio is reduced sufficiently to allow the elastic members 10 to contract to the position shown in Fig. 5. As the contraction of the members 10 occur, the lower ends of the reefing lines 5 are drawn upwardly toward the canopy by the members 10, allowing the lines 5 to slide through the rings 7, permitting the skirt of the canopy to expand to its full open diameter as shown in Figs. 2 and 5.

Figure 1:
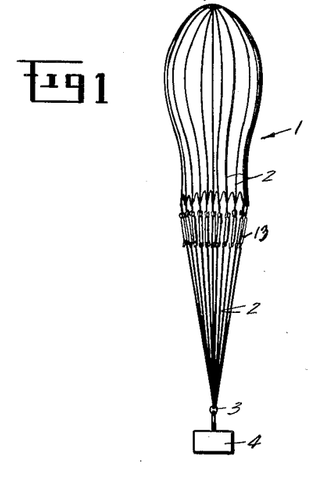
Fig. 1 is a somewhat schematic side elevation of a released parachute constructed in accordance with the invention, showing the same in reefed condition.

In the event that the chute has been released in the higher rarified atmosphere, at high speed, such as in the stratosphere, and the initial opening shock has been relieved by the gradual decelerating action above described, and the chute is descending with excessive velocity due to the thinness of the air, my improved parachute will effectively absorb any dangerous shock or rapid deceleration when the chute enters the denser air of the troposphere. The elastic members 10 absorb the shock or excessive pull of the load on the suspension lines 2, and as they are stretched to eliminate the slack portions 9 therein, the reefing lines 5 are automatically pulled downwardly to reef or contract the skirt portion of the canopy, reducing the effective drag area. When the gradual deceleration has been accomplished and the pull or tension on the elastic members 10 decreases sufficiently, the elastic members 10 automatically shorten in a predetermined ratio to the relative decrease in the effective load or tension on the lower ends of the shroud lines permitting the skirt of the canopy to expand as the reefing lines are moved upwardly or toward the canopy by the extensible members 10. As the relative chute drag to load ratio is reduced to predetermined safe limits, the skirt will then expand further to reduce the rate of descent to that of a conventional parachute, without subjecting the chute or load being lowered thereby to the excessive stretch shock or high deceleration referred to. Since the shroud lines 2, as illustrated in Figs. 1 and 5, each have one of the elastic members 10 interposed across the slack portions 9 therein, and each load suspension line 5 has an individual reefing line connected thereto below the slack portion 9, each shroud line 2 is cushioned independently of the others against the shock and load that is applied to that particular shroud line, and a segment of the canopy adjacent to that particular shroud line is reefed independently and automatically with respect to the reefing of the other segments of the canopy. The individual segments of the canopy are therefore reefed automatically in proportion to the amount of load or tension that is applied to the individual load suspension lines, and the load suspension lines 2 are also individually tensioned by the elastic members 10, so as to uniformly distribute the applied load to the segments of the canopy. In my improved arrangement the drag effect of the canopy, relative to the downward pull of the load, can never exceed a predetermined value or "safety factor", and since neither the chute nor the shroud lines can be subjected to excessive loadings they can be made of lighter materials without the danger of splitting, tearing, or the breaking of the load suspension lines, and the chute can be released at higher speeds without excessive loading, high opening shock, high deceleration, or stretch shock. These advantages are important when the chute is released at high Mach numbers, also when the chute is descending from higher altitude in thin air and enters the heavier density of the troposphere at a high velocity.

Figure 6:
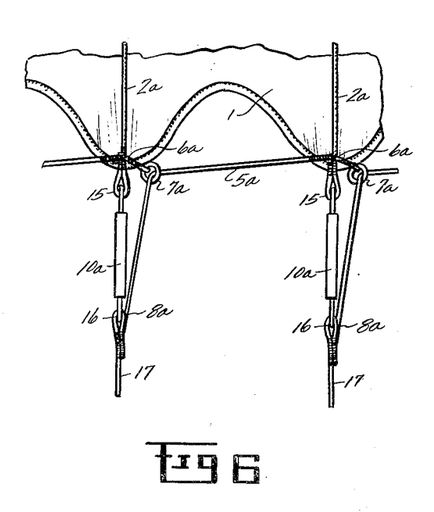
Fig. 6 is a similar view, showing a modified arrangement of elastic members in which the elastic members are interposed directly in the length of the load suspension lines.

Fig. 6 illustrates an arrangement which is similar to the structure disclosed in Figs. 1 to 5 except that the elastic members 10a are secured at their upper ends to loops or rings 15 which are formed on or secured to the lower ends of the upper portions 2a of the load suspension lines that extend across the canopy between the canopy segments, the lower ends of the elastic members 10a being also secured to loops or rings 16 which are formed in or are secured to the upper ends of the lower portions 17 of the load suspension or shroud lines or cords. The lower ends of the reefing lines 5a are secured to the suspension lines at the loops 16 while the other or upper ends of the reefing lines 5a are each secured to the lower edge of the canopy where the next or adjacent upper portion 2a of the shroud line crosses the lower edge of the canopy. The upper ends of the reefing lines 5a which extend laterally across the upper suspension lines 2a project beyond the suspension lines as shown in Fig. 6 and a reefing or snubbing ring 7a is secured thereon. The next or adjacent reefing line 5a passes through the ring on the adjacent or preceding reefing line and is slidable therein. In this form of my invention the normal load is carried primarily by the extensible members 10a and the reefing lines 5a. When excessive drag or deceleration takes place the extensible members 10a stretch, pulling the reefing lines to reef the skirt portion of the canopy and reduce the drag area of the canopy.

In Figs. 1 to 5 the elongation of the elastic members 10 is limited by the lengths of the looped or slack portions 9, so that when the extensible members are fully stretched or should break, the load is then carried by the shroud lines 2 and the reefing lines 5. The elongation of the elastic members 10 is limited by the strength of the elastic members and the lengths of the loops or slack portions 9 in the suspension lines, while in Fig. 6 the suspension lines 2a—17 do not limit the extension of the elastic members 10a and therefore a large portion of the suspended load may be transferred to the reefing lines if the drag is great, also when (the skirt of the canopy expands) the air enters the canopy to expand the skirt portion and holds the skirt portion extended, the reefing lines 5a carry an appreciable portion of the suspended load that is being lowered by the canopy.

Figure 7:
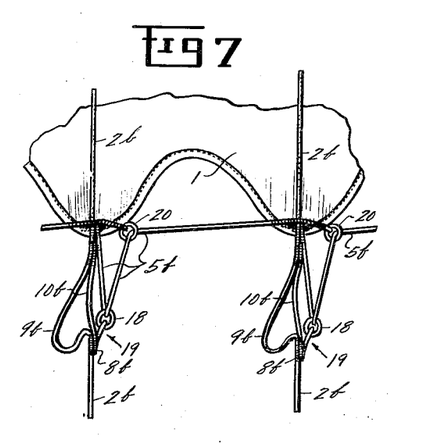
Fig. 7 is a further modification illustrating a slightly different reefing line arrangement.

Referring to Fig. 7, illustrating a modified reefing line arrangement, the load suspension lines are looped at 9b as in Figs. 1 to 5 to provide slack portions, and the elastic members 10b extend across these loop or slack portions 9b. Instead of the ends of the reefing lines 5b extending downwardly and being secured to the suspension lines 2b below the loops 9b, as in Figs. 1 to 5, a ring 18 is secured to each of the shroud lines 2b on a short strip 19, located below the loops 9b. The reefing lines 5b are each secured at one end to the skirt of the canopy above the loops or slack portions 9b and extend downwardly through the rings 18 and then upwardly, each reefing line 5b passing through a second ring member 20 secured at the edge of the skirt and then laterally across the edge of the canopy to the next or succeeding suspension line 2b, being secured at this point at the lower edge of the skirt, the reefing lines 5b each extending beyond the suspension lines 2b and the reefing rings 20 just mentioned are secured to each of these laterally extending end portions of the succeeding reefing lines. When the pull and drag ratio applied to the ends of the shroud lines 2b exceeds the resistance or tension offered by the extensible elastic members 10b the elastic members stretch and the reefing lines 5b are pulled downwardly, reefing the skirt portion of the canopy between the adjacent shroud lines. In this arrangement when the rings 18 are pulled downwardly by the load 4 on the suspension lines 2b the amount of reefing action is double that of the reefing action provided in this structure shown in Figs. 1 to 5, also the reefing line in Fig. 7 absorbs twice the pull or shock load on the reefing line before reefing of the canopy, as compared to the reefing line arrangement shown in Figs. 1 to 6 takes place. When the extensible member 7 has been stretched sufficiently to eliminate the loops or slack portions 9b, any further, or excessive shock loading is absorbed by the shroud lines 2b rather than by the reefing lines 5b and the elastic extensible members 10b. Of course, when the excessive loading is relieved, the extensible members 10b contract, raising the rings 18, which permits the skirt of the canopy to again expand to its full supporting diameter. Any time when the downward pull or tension on the shroud lines 2b exceeds the predetermined drag of the canopy, as determined by the elastic strengths of the extensible members 10b, the skirt of the canopy will be contracted or reefed reducing the drag area, and the canopy will be permitted to expand, increasing the drag area at any time when the suspended load pull is reduced below the aforesaid predetermined pull to drag ratio.

Figure 8:
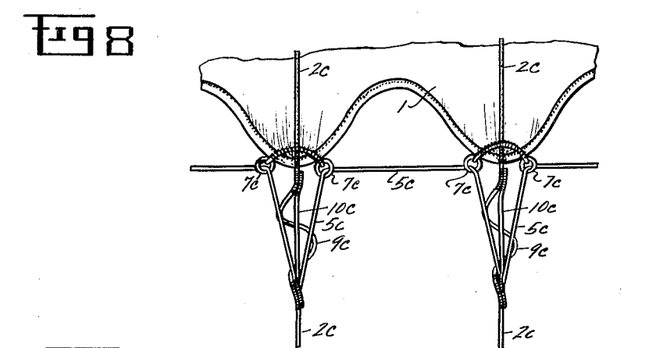
Fig. 8 is a fragmentary view illustrating a further modification of the reefing line arrangement.
Figure 9:
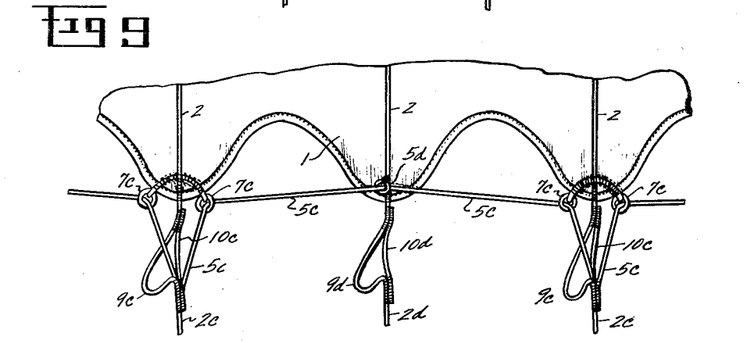
Fig. 9 is a modified arrangement of the reefing lines and load suspension lines, in which the reefing action is accomplished by the pull or tension on alternate load suspension lines.

Referring to Figs 8 and 9 the ends of the reefing lines 5c are not fixed to the edges of the canopy but are secured at each of their ends to one of the lateral spaced suspension lines 2c, below the looped or slack portions 9c, and below the lower ends of the elastic members 10c therein, slide or snubbing rings 7c being secured on short strips or cords to the canopy skirt at each side of each of the shroud lines 2c.

In Fig. 8 the intervening space or segment of the canopy between each of the shroud lines 2c will be gathered or reefed when excessive downward tension or pull occurs on either one or both of the adjacent shroud lines 2c. In this way the pull and yieldable elongation of one shroud line will reef two segments of the canopy.

In Fig. 9 one load suspension line 2d is interposed between each pair of suspension lines 2c and is provided with a load take-up loop or slack portion 9d, and an elastic or extensible member 10d, similar to the members 9c and 10c in Fig. 8 is provided, arranged for cushioning the opening or stretch shock on the suspension line. The extension of the elastic members 10d however do not effect the reefing action caused by the downward pull on the load suspension lines 2c at opposite sides of the lines 2d. The reefing cords 5c are preferably anchored at 5d, thus reefing one or the other, or both of the canopy segments adjacent the shroud lines 2d, depending upon which of the lines 2c receive the excessive loading or tension. As the reefing cords 5c each pass through a ring 7c, and are secured to the edge of the canopy at 5d, the reefing or gathering area included would be controlled by either of the shroud lines 2c and two segments at opposite sides of the shroud lines 2c would be reefed.

Figure 10:
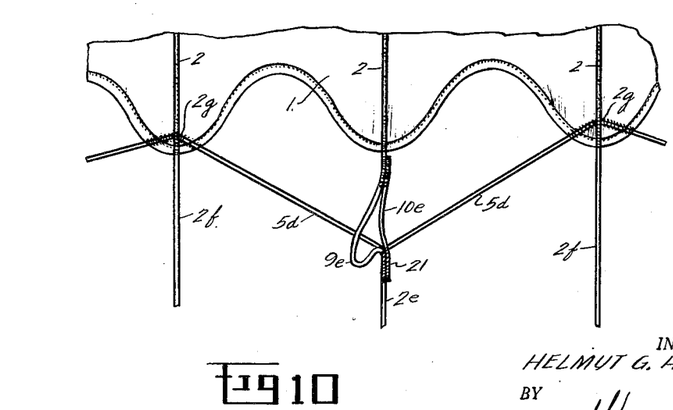
Fig. 10 is a further modification of the reefing line arrangement.

In Fig. 10 the extensible members 10e are secured across looped or slack portions 9e of every other or alternate load suspension line 2e. The gathering or reefing cords 5d are secured at their opposite ends to the alternate shroud lines 2e just below the looped portions, at 21 and incline upwardly from their secured ends and preferably extending to the edge of the skirt and secured to the shroud lines 2f at points 2g where they cross the intermediate non-stretchable shroud lines 2f. The shroud lines 2f do not have the looped or slack portions, or the elastic members, incorporated therein.

When the lines 2e and 2f are tensioned sufficiently by the relative drag to pull ratio between the canopy and the suspension load, the elastic members 10e will stretch, causing downward lateral pull to be exerted on the ends of the reefing cords 5d, this downward pull displacing the shroud lines 2e lateral toward the non-stretchable shroud line portions 2f to contract the skirt portions of the canopy between the shroud lines 2e and 2f. This action therefore produces a reefed action of the canopy skirt when excessive loadings take place.

Figure 11:
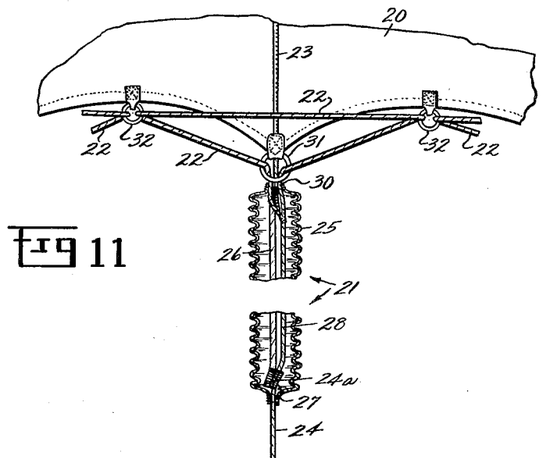
Fig. 11 is a modified form of shroud line and reefing line arrangement, in which the slack portions of the suspension lines are in the form of flexible sleeve members with the reefing lines passing freely into the upper ends thereof.
Figure 12:
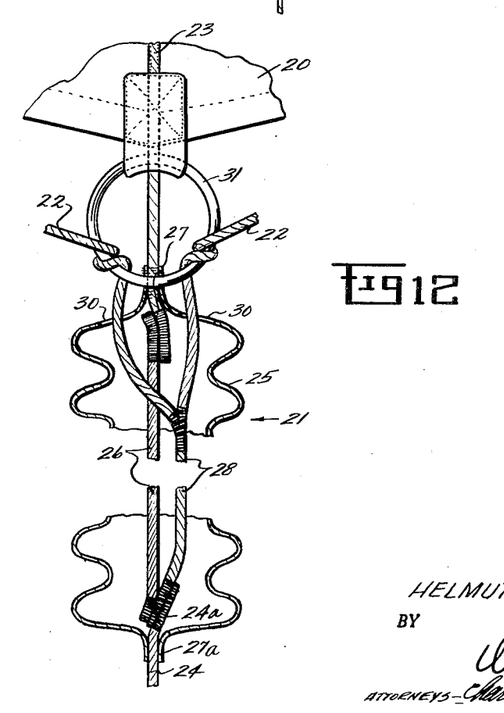
Fig. 12 is a fragmentary detail view of one of the reefing line guide ring means, in which the reefing line is looped over the ring to produce a snubbing action.

In Fig. 11 the parachute canopy is indicated at 20 while the load suspension means is indicated generally at 21 and the reefing means at 22. In this form of my invention the load suspension means or shroud lines comprise the non-stretchable upper and lower portions 23 and 24 with an intermediate flexible sleeve portion 25 formed of loosely woven fabric so that it may be collapsed longitudinally to form the slack portion in the load suspension line, similar to the loop portion 9 in Fig. 5. The sleeve portion 25 is, of course, securely fastened at its upper and lower ends respectively to the upper and lower portions 23 and 24, as shown in the drawings. When the sleeve is extended fully the slack in the suspension means is eliminated, further longitudinal separation between the portions 23 and 24 being resisted by the intermediate sleeve portion 25.

Located within the sleeve portion 25, with its upper and lower ends connected at 27 and 27a to the lower and upper ends of the portions 23 and 24, and with the upper and lower end portions of the sleeve portion 25, is an elastic extensible member 26 similar to the elastic member 10 in Fig. 5. The elastic member is connected in its non-stretched condition across the "slack" portion or collapsed sleeve member 25 and yieldably resists extension of the collapsed or slack portion 25 of the suspension means or composite shroud line 23, 24 and 25. Reefing means is also provided, being in the form of a reefing line 28 secured to the lower end of the slack portion or to the upper end of the lower shroud line portion 24 at 24a, so that upon elongation of the sleeve member 25 the reefing line is pulled downwardly.

The reefing line extends upwardly from its secured end along side of the elastic member 26 and is preferably bifurcated with two branches passing out of the upper end of the sleeve member 25 through openings 30. The upwardly extending branches of the reefing line pass through guide or snubbing rings 31 secured to the edge of the canopy and to the shroud line portions 23 and may be looped once around the rings 31 to increase the friction and snubbing action, after which the branches extend laterally in opposite directions, and pass through guide rings 32 which are anchored to the edge of the canopy skirt, intermediate the shroud line 23—25—24. After passing through the rings 32 the branches of the reefing lines extend in the opposite direction and join each other.

In packing the parachute, the lower ends of the slack portions or sleeves are pulled downwardly to stretch the elastic members 26 and elongate the sleeve portions 25. The reefing lines 28 are drawn into the sleeves, drawing the rings 32 toward each other to reef or gather the intermediate portion of the canopy. The elastic members 26 are then allowed to contract which shortens the sleeve portions with the slack in the reefing lines confined within the sleeve members 25, eliminating the danger of the reefing lines, elastic members and shroud lines from becoming snarled when the parachute is released at high speed. When the chute is released at high speed in the aforesaid reefed condition the small drag of the reefed canopy relative to the velocity of the attached load will immediately stretch the elastic members 26 until the slack in the sleeve portions 25 and in the reefing lines 28 is eliminated, retaining the canopy reefed. The relative pull of the load to the drag area of the reefed chute is such that deceleration is gradual and initial loading and stretch shock is reduced within safe limits. The looped portions of the reefing cords around snubbing rings reduces the tendency of air entering the skirt of the reefed chute from expanding the canopy until the tension on the lower ends of the reefing cords is reduced.

When the chute has decelerated to such an extent that tension of the elastic members 26 becomes greater than the pull of the load on the lower ends of the shroud lines 24, the elastic members contract, introducing slack in the suspension means and allowing the reefing lines to play out with a corresponding dereefing of the canopy. At any time however, when the deceleration becomes excessive, the pull of the load automatically controls the reefing action in the same manner as set forth in connection with the arrangement shown in Figs. 1 to 5.

My improved parachute incorporates safety features making it suitable for releasing at high speed. One of the features is the use of the shroud lines each incorporating the looped or slack portions with a resilient extensible number connected across the looped or slack portion to provide an effective cushioning action and tensioning of the individual suspension lines at all times, equalizing the individual loading of all of the suspension lines so that when any particular suspension line becomes overloaded the elastic member therein will stretch until the load is substantially equalized and uniformly carried by all of the suspension lines. By utilizing the reefing lines with a sort of pulley and snubbing arrangement of slide rings and connecting the lower ends of the reefing lines to the shroud lines below the looped or slacked, and elastic portions, as shown, a positive reefing action is accomplished which is controlled automatically by the relative drag to load ratio between the canopy as a whole, to the applied load as a whole. Also the individual reefing of the individual segments of the skirt in proportion to the individual tension or drag ratio between the individual suspension lines and those portions of the canopy to which they are connected, is accomplished.

It is preferable, however, in high speed airplanes to pack the chute in the conventional manner but with the chute in its reefed condition, the slack in the reefing lines being located below the guide and snubbing rings 7 and taken up, as shown in Fig. 3, the slack portions being carefully folded or coiled and inserted into flexible sleeve members 13, so that when the chute is released at high speed the elastic members will be initially stretched to eliminate the slack in the reefing cords as the reefing cords are with-drawn from the retaining sleeves 13. The retaining sleeves are important as they hold the reefing lines in place to prevent tangling or snarling, and in addition assist in holding the chute reefed until the initial shock stress and loading following release occurs. The retainers 13 preferably accommodate a portion of the suspension lines, as well as the reefing lines 5, separate sleeve sections may be provided in each retainer for keeping the reefing lines and suspension lines separate if desired.

What I claim is:

1. In a parachute adapted to be released at high speed, an extensible canopy comprising a plurality of radial segments secured together along their edges, load suspension lines connected to the canopy intermediate the segments and extending downwardly below the skirt portion having means at their lower ends to which a load to be lowered by the canopy can be attached, flexible reefing lines each connected at one end to one side of each segment at the edge of the skirt portion and extending laterally to substantially the other side of the segment and then downwardly, each reefing line having its other end connected to one of the load suspension lines at a predetermined distance below the canopy skirt portion, reefing cord guide means secured to the canopy adjacent the lower edge of the skirt portion slidably receiving each reefing line, means anchoring each guide means to the skirt portion adjacent the load suspension line to which the reefing line passing through the guide means is connected, the length of that portion of each reefing line which extends downwardly from the guide means to its connection with the load suspension line, when the canopy is extended, being substantially less than the length of that portion of the suspension line between the lower edge of the canopy skirt portion and the point of connection of the reefing line thereto, whereby slack portions are formed in the suspension lines by the reefing lines when the canopy is extended and predetermined downward pull on the suspension lines as resisted by the drag of the canopy tends to eliminate the slack portions and reef the segments of the canopy.

2. In a parachute adapted to be released at high speed, an extensible canopy having an apex vent, comprising a plurality of radial segments, load suspension lines connected to the canopy intermediate the segments above the skirt portion and extending downwardly below the skirt portion having common load suspension means at their lower ends to which a load to be lowered by the canopy can be attached, flexible reefing lines each connected at one end to one side of each segment at the edge of the skirt portion and extending laterally to substantially the other side of the segment and then downwardly, each reefing line having the other end thereof connected to one of the load suspension lines at a predetermined distance below the edge of the skirt portion, reefing cord retaining guide means secured to the canopy slidably receiving each reefing line, means anchoring each of the guide means to the edge of the canopy skirt adjacent the load suspension line to which the reefing line which passes therethrough is connected, that portion of each reefing line which extends downwardly from its guide means to its connection with the load suspension line, when the canopy is extended, being substantially less than the length of that portion of the suspension line between the lower edge of the canopy skirt portion and the point of connection of the reefing line thereto, whereby slacked portions are formed and maintained in the suspension lines by the reefing lines, when the canopy is extended, and predetermined downward pull on the suspension lines, as resisted by the drag of the canopy, tends to eliminate the slack portions and reef the segments of the canopy, and an extensible elastic member having its ends connected to the ends of the slack portion of each of the suspension lines, between the lower edge of the skirt portion of the canopy and the reefing line connection to the suspension line, for exerting predetermined relative upward pull on the lower end of the connected suspension line and on the lower end of the connected reefing line, tending to unreef the canopy skirt portion when the pull of the load relative to the drag of the canopy ratio is reduced.

3. In a parachute, a canopy having an annular skirt portion, load suspension lines connection thereto in uniformly spaced relation around the annular skirt portion and extending downwardly below the skirt portion, elongated yieldable resilient extensible means anchored at its opposite ends to the load suspension lines at predetermined spaced points therein below the skirt portion, and non-extensible reefing lines each connected at one end to one of the load suspension lines below the resilient extensible means therein and connected at another point in its length to the skirt portion of the canopy at a point disposed in laterally spaced relation to the load suspension line to which that reefing line is connected, whereby predetermined downward pull on the lower ends of the load suspension lines extends the resilient extensible means, pulling the reefing lines relatively downward to reef the canopy, and a predetermined reduction in the downward pull permits the extensible means to contract and pull the lower portions of the load suspension lines and the reefing lines upwardly, allowing the skirt of the canopy to unreef and expand.

4. In a parachute, a canopy having an angular skirt portion, a plurality of load suspension lines connected to the skirt portion and extending downwardly therefrom in uniformly spaced relation, elongated resilient extensible means interposed in the load suspension lines below the canopy, a plurality of reefing lines each connected at one end to skirt portion of the canopy in laterally spaced relation to one of the load suspension line and extending toward that load suspension line, retaining guide and snubbing means secured at the lower edge of the canopy adjacent the load suspension lines, each guide means slidably receiving the reefing line therethrough which extends from its secured point toward that suspension line, said reefing lines extending downwardly from said guide means adjacent to the downwardly extending portions of the load suspension lines to points below the extensible means and anchored to the load suspension lines below the extensible means.

5. In a parachute, a canopy having an annular skirt portion, load suspension lines connected thereto in uniformly spaced relation around the skirt portion and extending downwardly, resilient extensible means anchored at its opposite ends to the load suspension lines at predetermined spaced points therein below the skirt portion, and non-extensible reefing lines each connected adjacent one end to one of the load suspension lines below the resilient extensible means therein and at another point in their length to the skirt portion of the canopy in laterally spaced relation to the load suspension line to which that reefing line is connected, whereby said reefing lines are drawn downwardly by the load suspension lines to reef or contract the skirt of the canopy to reduce the initial drag thereof when the parachute is released, and sleeve retaining means carried on the suspension lines receiving and yieldably retaining the said reefing lines, the suspension lines, and the resilient extensible means therein while the parachute is packed and prior to release of the parachute and during release, to prevent tangling and snarling of said reefing and load thereof, prior to the application of load to the suspension lines following release of the chute.

6. In a parachute, a canopy, having a skirt portion, load suspension lines extending downwardly from the lower edge of the skirt portion, each suspension line having a slack portion formed therein, an elastic extensible member of predetermined strength and length secured at its opposite ends to the opposite ends of each slack portion to yieldably maintain a predetermined slack in the suspension lines, said elastic members being extensible upon the application of a predetermined relative downward pull on the suspension lines below the slack portions, relative to the drag of the canopy, to equalize the application of the load on all of the load suspension lines and absorb the "stretch shock" on the suspension lines.

7. Apparatus as claimed in claim 6, including reefing lines each secured at one end to one of the load suspension lines below the slack portion therein and extending upwardly past the slack portion to points adjacent the lower edge of the skirt portion, guide rings secured to the skirt portion adjacent the suspension lines, slidably receiving said upwardly extending portions of the reefing lines, said reefing lines extending laterally from the guide rings and secured to the edge of the skirt portion in laterally spaced relation to the guide rings, whereby downward pull on the lower ends of the suspension lines extends the elastic members tending to eliminate slack in the suspension lines and pulls the lower ends of the reefing lines downwardly to reef the skirt of the canopy.

8. Apparatus as claimed in claim 7 in which the laterally extending portions of the reefing lines extend across the suspension lines at their secured portions and are looped upon themselves, with the reefing line guide rings secured in the looped portions.

9. Apparatus as claimed in claim 7, including flexible retainer sleeve members on the load suspension lines, having the slack portions of the suspension lines, the elastic extensible members, and the slack portions of the reefing lines folded and inserted therein when the parachute is in initial reefed condition, said sleeve members yieldably holding the canopy reefed prior to release, whereby the sudden application of excessive load, following release of the parachute at high speed, to the ends of the suspension lines in excess of a predetermined load, as determined by the resistance to elongation of the elastic extensible members, stretches the elastic members to eliminate the slack in the suspension lines, simultaneously drawing the reefing lines from the sleeve members and eliminating the slack in the reefing lines to maintain the canopy in reefed condition, and reduction in the pull load on the suspension lines, following deceleration and shock stretch, permits the elastic members to contract to introduce the slack in the suspension lines and allow the reefing lines to move upwardly through the guide rings, permitting the canopy to expand to its unreefed condition.

10. In a parachute, a canopy having an annular skirt portion, a plurality of shroud lines connected to the canopy and extending downwardly toward each other from the lower edge of the canopy in uniformly spaced relation around the canopy, elongated resilient extensible members fixed at one end to the shroud lines adjacent the lower edge of the skirt portion, and fixed at their other end, when in stretched condition, to the shroud lines at predetermined spaced points below the canopy, to provide predetermined slack in the shroud lines intermediate the connected ends of the extensible members when not extended, guide ring means secured to the lower edge of the canopy skirt portion adjacent each of the shroud lines, and reefing lines each fixed at their lower ends to one of the shroud lines at the lower end of the slack portion therein and extending upward and slidably received through the guide ring means, and then extending laterally toward the next shroud line adjacent to the shroud line to which that reefing line is attached, said reefing lines being operatively anchored to the canopy skirt at the ends of the laterally extending portions thereof.

11. In a parachute, a canopy having a skirt portion, primary flexible elongated load suspension means extending downwardly from the lower edge of the skirt portion, each suspension means having normally a slack portion formed therein, an elastic extensible member of predetermined strength and length secured adjacent its opposite ends to the suspension means at opposite ends of the slack portion to yieldably maintain the slack portion in the load suspension means, reefing lines connected to the load suspension means at the lower ends of the slack portions and at the lower ends of the elastic extensible members, reefing line guide means secured to the canopy adjacent the upper ends of the load suspension means, said reefing lines extending upwardly from their secured portions on the suspension means each passing slidably through one of the guide means and then laterally adjacent the skirt and connected to the skirt at a point spaced from the suspension means which has that reefing line secured thereto, whereby excessive downward pull on the lower ends of the load suspension means stretches the elastic members to eliminate the slack in the suspension means and maintains downward tension on the reefing lines to keep the skirt of the canopy reefed until a reduction in downward pull, following deceleration, occurs permitting the elastic members to contract, permitting the reefing lines to move upwardly and slide through the guide means, allowing the canopy to unreef and expand.

12. Apparatus as claimed in claim 11, in which the slack portions of the suspension lines are in the form of flexible elongated sleeve members each sleeve member having a reefing cord extending freely into the upper end thereof and secured thereto at the lower end of the sleeve member, and the elastic extensible member is located within sleeve member with its opposite ends connected to the sleeve member at the opposite ends of the sleeve member.

13. Apparatus as claimed in claim 11 in which the reefing line guide means comprises reefing line guide and friction snubbing means for frictionally resisting the unreefing movement of the laterally extending portions of the reefing lines in a predetermined ratio to the downward tension on the downwardly extending portions of the reefing lines which are connected to the lower ends of the slack portions of the suspension means.

HELMUT GUSTAV HEINRICH.

REFERENCES CITED

The following references are of record in the file of this patent:

UNITED STATES PATENTS

| Number | Name | Date |
|---|---|---|
| 1,340,259 | Taylor | May 18, 1920 |
| 1,398,303 | Mitchell | Nov. 29, 1921 |
| 2,384,127 | Nailor | Sept. 4, 1945 |

FOREIGN PATENTS

| Number | Country | Date |
|---|---|---|
| 8,649 | Great Britain | of 1915 |
| 128,669 | Great Britain | July 3, 1919 |